Patented Jan. 1, 1952

2,580,429

UNITED STATES PATENT OFFICE 2,580,429

CATALYTIC STRUCTURE OF SILICA ON ALUMINA-COATED PORCELAIN

Eugene J. Houdry, Ardmore, Pa., and James W. Harrison, Woodbury, N. J.; said Harrison, assignor to said Houdry No Drawing. Application September 23, 1949,
Serial No. 117,489

7 Claims. (Cl. 252—455)

The object of this invention is to provide a catalyst suitable for use in the conversion of a relatively high boiling hydrocarbon fraction to a relatively low boiling hydrocarbon fraction, being especially adapted for use in the process forming the subject matter of an application filed by Eugene J. Houdry of even date herewith entitled "Process and Apparatus for Catalytically Cracking Hydrocarbons." The catalyst, and the process of producing it, herein described is, however, not limited to this particular use.

Heretofore, the cracking catalysts in wide use have been obtained either from activated natural clays of the bentonite type or by co-precipitation of silica and alumina.

We have found that by heating to a temperature of 1000–1200° F. a mixture of finely divided silica and finely divided alumina, the silica reacts with the alumina to form a combination having the characteristics of the above mentioned cracking catalysts. We studied the properties of such mixtures in two ways. First, we deposited alumina on silica gel by dipping the silica gel in a solution of aluminum nitrate. This material was brought to a temperature of 1100° F. so as to decompose the aluminum nitrate. Second, we dipped active alumina pellets into an organic compound containing silica such as ethyl ortho silicate, as such or in solution, or mixed with water, or tetra ethyl hexa ammonium silicate and brought the material up to 1200° F. in an oxidizing atmosphere to decompose the organic silicates. Any organic compound containing Si and $NO_2$ which on thermal decomposition leaves only $SiO_2$ may be substituted for the silicates specified.

The following cracking results were obtained when tested in a standard Cat A unit:

| | |
|---|---|
| Silica Gel without Alumina | 12.6% Gasoline 2.23% coke |
| Silica Gel +0.1% Alumina | 21.8% Gasoline 2.40% coke |
| Silica Gel +1.0% Alumina | 36.5% Gasoline 3.4% coke |
| Silica Gel +5.0% Alumina | 41.8% Gasoline 4.7% coke |
| Silica Gel +10.0% Alumina | 46.4% Gasoline 4.95% coke |
| Activated Alumina Pellets without $SiO_2$ | 4.0% Gasoline trace coke |
| Activated Alumina Pellets +10% $SiO_2$ | 19.8% Gasoline 0.7% coke |
| Activated Alumina Pellets +20% $SiO_2$ | 33.4% Gasoline 1.8% coke |
| Activated Alumina Pellets +30% $SiO_2$ | 38.4% Gasoline 2.7% coke |

As can be seen in the case of addition of silica to active alumina pellets, the cracking activity increases as the ratio of the $SiO_2$ to $Al_2O_3$ increases and a catalyst having an $Al_2O_3$ to $SiO_2$ ratio of 3.27:1 ($SiO_2$=30.6% weight of the $Al_2O_3$) gave the following results:

Gasoline____percent volume of the charge__ 38.4
Gas_____percent weight of the charge__ 9.7
Coke_____do____ 2.7 as compared to the following results obtained from a standard silica-alumina coprecipitated catalyst having a ratio of $Al_2O_3$ to $SiO_2$ of 1:8 as presently used in commercial fixed bed units:

Gasoline____percent volume of the charge__ 37.0
Gas_____percent weight of the charge__ 12.4
Coke_____do____ 3.6

Interpolation of the above results to the same gasoline yield gives the following comparison of products obtained:

| | Per Cent Gasoline | Per Cent Gas | Per Cent Coke |
|---|---|---|---|
| Low $SiO_2$ content catalyst | 37 | 9.34 | 2.6 |
| Standard Si-Al catalyst | 37 | 12.40 | 3.6 |

Catalytic activity indices in commercial use range from 30–40 in fixed bed units, from 25–32 in moving bed units and from 20–25 in other units using cracking catalysts.

For all practical purposes it can be safely stated from the above results that the use of cracking catalysts in which the alumina is in excess of the silica will insure a saving of 30 to 40 per cent in the coke formation for the same yield of gasoline.

The gas quality in the case of the low percentage silica catalyst is slightly above the quality of the gas produced with the standard synthetic alumina-silica catalyst.

As an example of the method of preparation of such a catalyst, a weighed amount of active alumina in pellet form 3 mm. diameter x 3 mm. long having a porosity in the range of 30–40% is oven dried at 220° F. and then immersed in ethyl ortho silicate until the pellets are saturated with the liquid. The pellets are then removed and the excess liquid allowed to drain off. Then the soaked pellets are heated to approximately 220° F. for one hour to drive off any moisture before subjecting the saturated pellets to heat treatment. The pellets are then brought up to decomposition temperature and the temperature of the catalyst is increased to 1000–1200° F. in an oxidizing atmosphere.

By this method a $SiO_2$ deposit of approximately 6% by weight of the alumina is obtained in one operation. Such an amount of silica is not sufficient to obtain a catalyst of high activity; in fact, only 20 activity index is obtained when the silica is 10% by weight of the alumina. For higher concentrations of silica the above procedure is duplicated as many times as required to obtain the desired activity of the catalyst.

So far as described, the product of the process is without commercial utility as a catalyst, especially when used in the conversion of high boiling hydrocarbons to low boiling hydrocarbons, since, while it gives an active catalyst, one of the components, namely, the activated alumina, serves as a support, and the only support, for the silica; that is, the catalyst is self-supporting. It is, however, devoid of the strength necessary to maintain it self-supporting. The pellets quickly fall to powder. For this reason, their use in the moving bed catalytic process is obviously out of the question, and even in the fixed bed process the effect would be the same, that is, the pellets would soon fall to powder.

In order to adapt our process to the manufacture of a catalyst structure and apparatus intended particularly for use in catalytic cracking, we first produce a catalyst structure comprising a support of porcelain, or any equivalent support which, like porcelain, is relatively impervious, physically resistant, and capable of sustaining temperature shocks, and that is itself inert as a catalyst. The support is preferably in the form of a rod, coated with active alumina, in accordance with the process described in an application filed by Louis E. Malina, April 21, 1950, Serial No. 157,413.

For example, assuming that the inert porcelain support is in the form of a rod, or of a multiplicity of rods closely associated and spaced apart, and that the porcelain is impervious: 1000 grams of commercially active alumina powder (catalyst grade) are added to a saturated solution of aluminum nitrate (or hydrochloric acid or any acid or sulfate solution of the base) composed of 635 grams of aluminum nitrate per 1000 cc. of water. The powder and the liquid are thoroughly mixed and ground together in a pebbled ball mill, after which a heterogeneous solution of aluminum nitrate and alumina powder is obtained. The porcelain rod is then immersed in the solution for a period of (say) one minute. The rod is then air dried for (say) five minutes, then oven dried at a temperature of about 220–230° F. and then heated slowly for about one hour to a temperature of (say) 800° F. and cooled gradually to room temperature. To give the alumina film the necessary strength and secure its adherence to the rod, one or more similar dippings may be necessary, each followed by successive heatings and subsequent cooling as described. While this condensed description is all that is required to enable one skilled in the art to produce the alumina-coated rod, the said application describes the process in more detail, a more extended treatment being required if the porcelain has some degree, e. g., ten per cent, of porosity.

The active alumina coating is then impregnated with silica, as hereinbefore described. The ratio of silica to alumina should be from 1:2 to 1:5; or it may be as low as 1:10. The thickness of the alumina-silica combination on the inert porcelain support should be such that the proportion of the former to the latter by volume should be between 20 and 50 per cent., preferably on the order of 30 per cent. For example, a porcelain rod having a diameter of 1/8" may have a thickness of preferably .011", but may vary from (say) .008" to .014".

What is claimed is:

1. The process of manufacturing a catalyst structure and composition which comprises applying to an inert porcelain support a coating of active alumina and impregnating said coating with silica in a proportion of between 1 silica to 10 alumina and 1 silica to 2 alumina.

2. The process of manufacturing a catalyst structure and composition which comprises applying to an inert porcelain support a coating of active alumina and impregnating said coating with silica in a proportion of between 1 silica to 10 alumina and 1 silica to 2 alumina until the thickness of the alumina-silica combination on the inert porcelain support is such that the proportion of the former to the latter by volume is between 20 and 50 per cent.

3. A catalyst structure and composition which comprises an inert porcelain support having thereon a coating of alumina impregnated with silica in a proportion between 1 silica to 10 alumina and 1 silica to 2 alumina.

4. A catalyst structure and composition which comprises an inert porcelain support having thereon a coating of alumina impregnated with silica in a proportion between 1 silica to 10 alumina and 1 silica to 2 alumina, the thickness of the alumina-silica combination on the inert porcelain support being such that the proportion of the former to the latter by volume is between 20 and 50 per cent.

5. The process of manufacturing a catalyst structure which comprises adding finely divided alumina to a saturated solution of aluminum nitrate and grinding to produce a heterogeneous solution of aluminum nitrate and finely divided alumina, applying said solution to a film support of catalytically inert porcelain, subjecting the coated porcelain to the temperature required to leave on the porcelain support a film of active alumina, and impregnating said coating with silica until the ratio of silica to alumina is between 1:10 and 1:2.

6. A catalyst structure and composition adapted for use as a catalyst in the cracking of hydrocarbons which comprises a multitude of closely associated, but spaced apart, catalytically inert rods coated with alumina impregnated with silica in a proportion between 1 silica to 10 alumina and 1 silica to 2 alumina.

7. The process of manufacturing a catalyst structure which comprises adding finely divided alumina to a saturated solution of aluminum nitrated and grinding to produce a heterogeneous solution of aluminum nitrate and finely divided alumina, applying said solution to a film support of catalytically inert porcelain, subjecting the coated porcelain to the temperature required to leave on the porcelain support a film of active alumina, applying to the alumina film-coated porcelain support an organic compound containing silica until the alumina is saturated, draining off excess liquid, heating the silica-impregnated alumina film to the relatively low temperature required to remove the moisture, heating the silica-impregnated alumina film in an oxidizing atmosphere to the temperature required to decompose the organic silicate and permit the silica to react with the alumina, and repeating the operation until the ratio of silica to alumina is between 1:10 and 1:2.

EUGENE J. HOUDRY.
JAMES W. HARRISON.

REFERENCES CITED

The following references are of record in the file of this patent:

UNITED STATES PATENTS

| Number | Name | Date |
|---|---|---|
| 1,939,647 | Arnold et al. | Dec. 19, 1933 |
| 2,242,627 | Strickland | May 20, 1941 |
| 2,394,796 | Marisic | Feb. 12, 1946 |
| 2,493,896 | Pardee et al. | Jan. 10, 1950 |